United States Patent [19]

Matsunuma

[11] Patent Number: 6,091,708
[45] Date of Patent: *Jul. 18, 2000

[54] TRAFFIC SHAPER WITH MULTIPLY QUEUED VIRTUAL PATHS

[75] Inventor: Keiji Matsunuma, Tokyo, Japan

[73] Assignee: Oki Electric Industry Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/873,710

[22] Filed: Jun. 12, 1997

[30] Foreign Application Priority Data

Jun. 28, 1999 [JP] Japan .................................. 8-168847

[51] Int. Cl.[7] .................................................. H04L 12/56
[52] U.S. Cl. ........................ 370/233; 370/253; 370/397; 370/465
[58] Field of Search .................................. 370/412, 468, 370/415, 416, 429, 414, 417, 418, 428, 389, 395–397, 230, 232–234, 235, 236, 465, 252–253, 254, 409, 545; 709/240, 249

[56] References Cited

U.S. PATENT DOCUMENTS

| | | | |
|---|---|---|---|
| 5,457,687 | 10/1995 | Newman | 370/85.3 |
| 5,499,238 | 3/1996 | Shon | 370/415 |
| 5,515,359 | 5/1996 | Zheng | 370/231 |
| 5,793,747 | 8/1998 | Kline | 370/230 |
| 5,812,527 | 9/1998 | Kline et al. | 370/232 |
| 5,898,669 | 4/1999 | Shimony et al. | 370/232 |
| 5,991,268 | 11/1999 | Awdeh et al. | 370/232 |
| 6,002,668 | 12/1999 | Miyoshi et al. | 370/232 |

OTHER PUBLICATIONS

ITU–T Recommendation I.371, Traffic Control and Congestion Control in B–ISDN, Telecommunication Standardization Sector of International Telecommunication Union, May 1996.
Traffic Management Specification, Version 4.0, The ATM Forum Technical Committee, Apr. 1996.
Expandable Atom Switch Architecture (XATOM) for ATM Lans, Ruixue Fan et al., International Conference on Communications (ICC), New York, Jan. 1994, pp. 402–409.
The Rate–Based Flow Control Framework for the Available Bit Rate ATM Service, Flavio Bonomi et al., IEEE Network: The Magazine of Computer Communications, New York, Mar./Apr. 1995, No. 2, pp. 25–39.

*Primary Examiner*—Seema S. Rao
*Attorney, Agent, or Firm*—Rabin & Champagne, PC

[57] ABSTRACT

A traffic shaper that feeds cells into an asynchronous-transfer-mode virtual-path-switching network has two queues per virtual path: a first queue providing a regular class of service, and a second queue providing a variable class of service. Cells are taken from the first queue in preference to the second queue, combined traffic from the two queues is kept within a peak cell rate, and traffic from the second queue is kept within an allowed cell rate. Forward resource-management cells are inserted at certain intervals in the cell flow taken from the second queue, and the allowed cell rate is adjusted according to backward resource-management cells received in reply. A third queue for priority cell traffic, limited to a priority cell rate lower than the peak cell rate, may also be provided.

24 Claims, 11 Drawing Sheets

TRAFFIC SHAPER WITH MULTIPLY QUEUED VIRTUAL PATHS

BACKGROUND OF THE INVENTION

The present invention relates to a traffic shaper in an asynchronous-transfer-mode communication network, more particularly to a traffic shaper that controls the flow of cells into a virtual-path-switching network.

The asynchronous transfer mode (hereinafter, ATM) is advantageous for multimedia communication and is currently employed in many local area networks. An ATM network transports fixed-length packets, referred to as cells, on a plurality of virtual paths, each comprising one or more virtual channels. A virtual-path-switching network switches the cell traffic on a virtual-path basis by an asynchronous time-division multiplexing scheme in which the virtual paths do not have fixed time-slot assignments.

Standards for the use of ATM in broadband integrated-services digital networks (B-ISDNs), and for traffic control and congestion control in such networks, have been recommended by the Telecommunication Standardization Sector of the International Telecommunication Union, e.g. in ITU-T Recommendation I.371. Traffic management specifications have also been drafted by the Technical Committee of the ATM Forum. These standards and specifications indicate methods of regulating the rate of cell flow on virtual paths and channels within an ATM network.

The function of a traffic shaper is to control the cell flow into the network so that the traffic on each virtual path is kept within the rate allowed for the path. A conventional traffic shaper maintains a single first-in-first-out queue for each virtual path being controlled. Arriving cells are placed in the queue specified by address information in the cell header. Cells are taken from each queue at a rate not exceeding a specified peak cell rate.

The peak cell rate is one of the several parameters determining the class of service provided on the virtual path. Other parameters concern such quality factors as cell loss ratio, cell transfer delay, and the variation in this delay. To meet the requirements of different types of cell traffic, a network may have to provide many classes of service. With the conventional traffic shaper, since all cells placed in the same queue receive basically the same class of service, a large number of separate virtual paths are required, placing a strain on the network's virtual-path-switching resources.

SUMMARY OF THE INVENTION

It is accordingly an object of the present invention to increase the number of service classes in an ATM virtual-path-switching network, without increasing the number of virtual paths.

A traffic shaper according to a first aspect of the invention has two queues per virtual path. A header converter reads the headers of cells being sent into the network and determines, for each cell, an outgoing virtual path, an outgoing virtual channel, and an internal class. There are two internal classes: a first class or regular class, and a second class or variable class. A cell distributor places first-class cells in the first queue of the designated outgoing virtual path, and places second-class cells in the second queue of the designated virtual path.

For each virtual path, the traffic shaper also has an inserter that inserts forward resource-management cells into the cell flow on the virtual path.

A traffic control table stores parameters specifying, for each virtual path, a peak cell rate, an allowed cell rate, and a resource-management cell rate. A read controller, operating under control of an output scheduler, takes cells from the first and second queues, and takes forward resource-management cells from the inserters. In each virtual path, cells in the first queue are taken in preference to forward resource-management cells, which are taken in preference to cells in the second queue, subject to rate control as follows. The flow of forward resource-management cells on each virtual path is kept within a certain fraction of the allowed cell rate, the fraction being specified by the resource-management cell rate. The combined flow of forward resource-management cells and cells from the second queue is kept within the allowed cell rate. The total cell flow on the virtual path is kept within the peak cell rate.

An extractor receives backward resource-management cells returned in reply to the forward resource-management cells, and notifies the output scheduler of congestion indications in the backward resource-management cells. The output scheduler increases the allowed cell rate when congestion is not indicated, reduces the allowed cell rate when congestion is indicated, and also reduces the allowed cell rate when expected backward resource-management cells fail to arrive.

According to a second aspect of the invention, the traffic shaper also has a third queue for each virtual path, and there are three internal classes. The third class is a priority class, for which the traffic control table stores a priority cell rate. The priority cell rate is less than the peak cell rate. The cell distributor places priority-class cells in the third queue of the designated virtual path. The read controller takes cells from the third queue in preference to cells from the first queue, keeping the flow of cells from the third queue within the priority cell rate. In other regards, the second aspect of the invention is similar to the first aspect.

DETAILED DESCRIPTION OF THE INVENTION

Embodiments of the invention will be described below with reference to the attached illustrative drawings.

Figure 1:
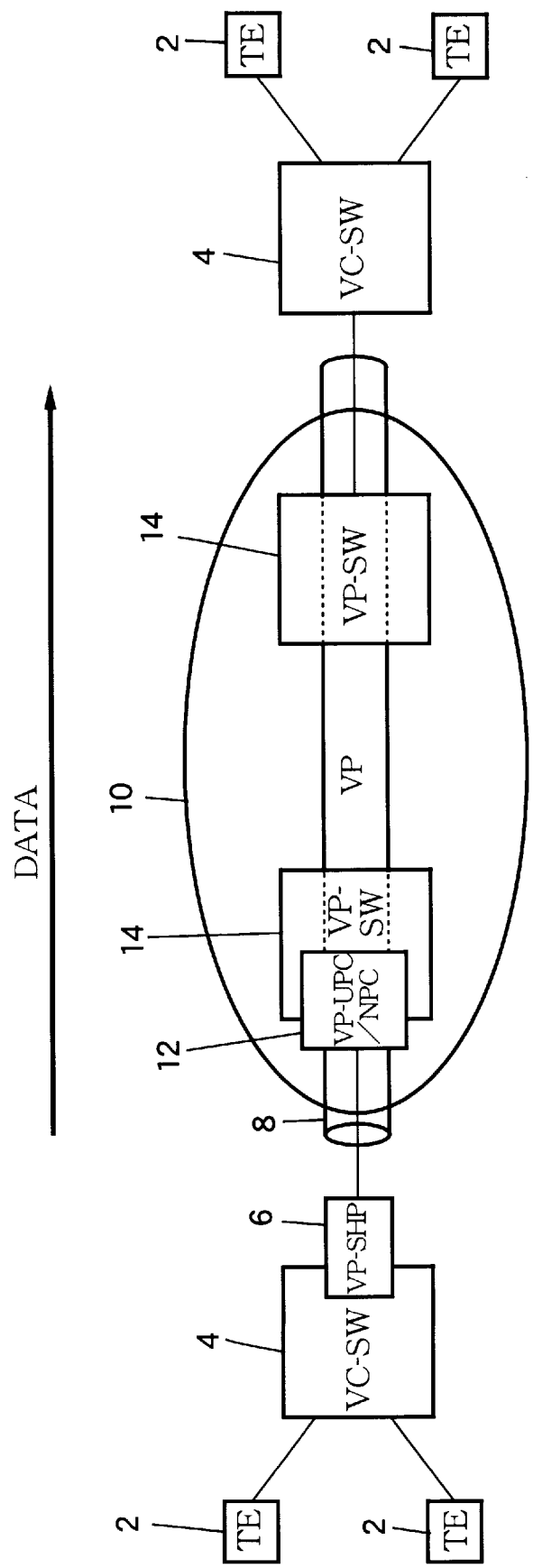
FIG. 1 is a diagram of part of an ATM network, showing the position of the traffic shaper.

FIG. 1 illustrates the position of a traffic shaper in an ATM virtual-path-switching network. The network transports data between various terminals 2, referred to as terminal equipment or TE. The data flow illustrated in this drawing is from left to right. On the left side of the drawing, source terminals 2 are coupled to a virtual-channel switch (VC-SW) 4. A virtual-path traffic shaper 6 controls the flow of cell traffic from the virtual-channel switch 4 onto one or more virtual paths 8. For simplicity, only one virtual path is shown in the drawing. Virtual paths are unidirectional; the data flow on the virtual path in FIG. 1 is from left to right.

The virtual path 8 enters a virtual-path-switching network 10, which has policing apparatus 12, also referred to as virtual-path usage parameter control or virtual-path network parameter control (VP-UPC/NPC) apparatus, for enforcing compliance with traffic limits. The network 10 also has virtual-path switching apparatus (VP-SW) 14 for switching virtual paths from one network node to another. Besides switching, the virtual-path switching apparatus 14 carries out such functions as connection admission control, resource management, and priority control. Each virtual path that exits the network terminates at another virtual-channel switch 4, which routes the cells on different virtual channels to the appropriate destination terminals 2.

Although a virtual path is by definition unidirectional, each virtual path is paired with another virtual path on which cell traffic flows in the opposite direction. The two paired paths share the same virtual path identifier (VPI).

The headers of user-data cells transmitted on the ATM networks in the embodiments below have an explicit forward congestion indication bit (EFCI), which is set to inform downstream network nodes of congestion. The network also transmits resource-management (RM) cells, which can be classified as forward resource-management (FRM) and backward resource-management (BRM) cells. The RM cells have a congestion indication bit (CI) in the cell body.

Figure 2:
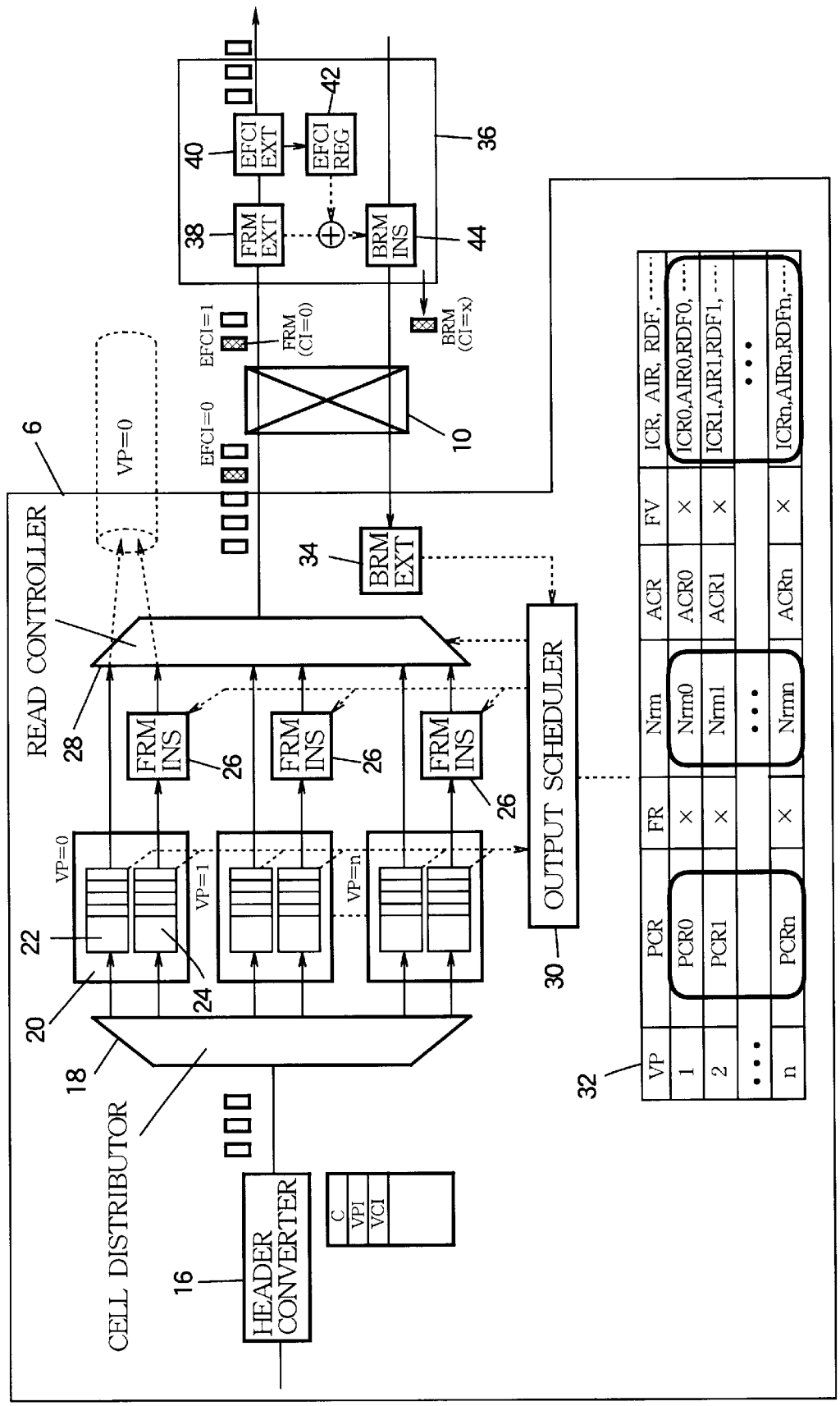
FIG. 2 is a block diagram illustrating a first embodiment of the invention.

FIG. 2 illustrates a traffic shaper 6 according to a first embodiment of the invention. The traffic shaper 6 comprises a header converter 16, a cell distributor 18, and a number of pairs of queues 20, corresponding to the virtual paths (VPs) serviced by the traffic shaper. In the drawing, the virtual paths are numbered from zero to n, where n is an arbitrary positive integer. Each pair of queues 20 comprises a regular-class queue 22 and a variable-class queue 24.

Coupled to the output end of each variable-class queue 24 is an FRM inserter (FRM INS) 26. A read controller 28 sends cells from the queues 22 and 24 and FRM inserters 26 into the virtual-path-switching network 10. The FRM inserters 26 and read controller 28 are controlled by an output scheduler 30, with reference to a traffic control table 32, and with reference to BRM cells received by a BRM extractor (BRM EXT) 34.

The regular-class queues 22 and variable-class queues 24 are, for example, first-in-first-out memory devices. Alternatively, these queues can be maintained by means of pointers in a general-purpose memory device.

The BRM cells are received from resource-management-cell (RM-cell) terminators 36 disposed in, for example, virtual-channel switches (not visible) at which cell traffic exits the virtual-path-switching network 10. One RM-cell terminator 36 is shown as an example in the drawing. The RM-cell terminator 36 comprises an FRM extractor (FRM EXT) 38 that extracts FRM cells from the incoming cellstream, an EFCI extractor (EFCI EXT) 40 that reads the EFCI bit in each incoming cell, an EFCI register (EFCI REG) 42 that stores the latest EFCI bit value received on each virtual path, and a BRM inserter (BRM INS) 44. The BRM inserter 44 creates BRM cells by stamping EFCI bit values stored in the EFCI register 42 onto FRM cells extracted by the FRM extractor 38, and inserts these BRM cells into a cellstream sent back into the virtual-path-switching network 10.

For each virtual path (VP), the traffic control table 32 has a set of parameters comprising a peak cell rate (PCR), a resource-management cell rate (Nrm), an initial cell rate (ICR), an additive increase rate (AIR), a rate decrease factor (RDF), and other parameters not relevant to the present invention. The suffixes $0, 1, \ldots, n$ are virtual-path numbers. These parameters, enclosed in thick lines in FIG. 2, are set by network software, as in ATM networks in general.

For each virtual path, the traffic control table 32 also has an allowed cell rate (ACR) parameter and a pair of time-out flags (FR and FV); the ACR parameter and time-out flags are set and maintained by the output scheduler 30. For each virtual path, one time-out flag (FR) is set and cleared according to the peak cell rate, and the other time-out flag (FV) is set and cleared according to the allowed cell rate.

Figure 3:
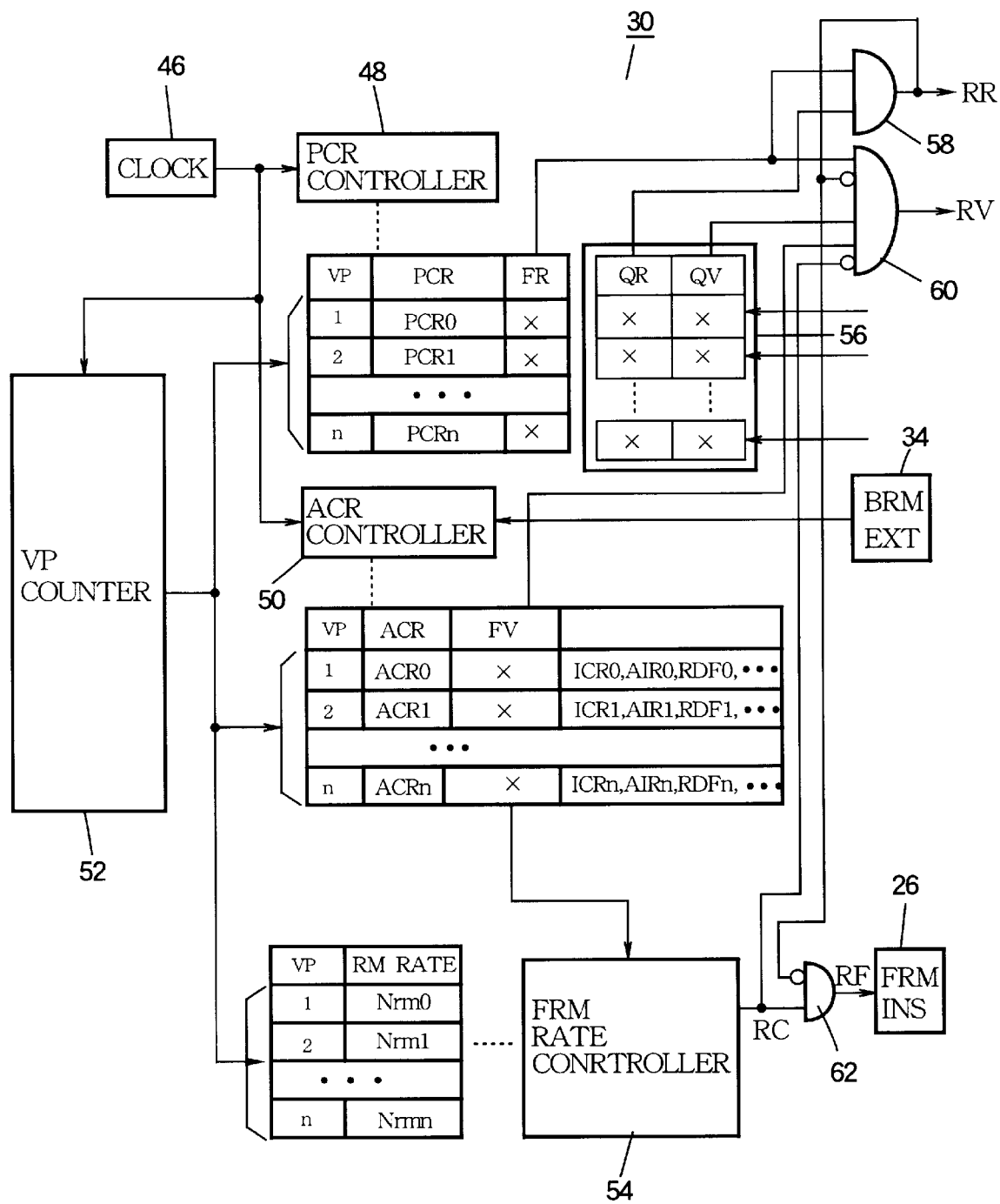
FIG. 3 illustrates the internal structure of the output scheduler in the first embodiment.

FIG. 3 shows the internal structure of the output scheduler 30. A clock generator 46 supplies a clock signal to a PCR controller 48, an ACR controller 50, and a virtual path counter 52. The virtual path counter 52 selects the virtual paths in turn. The PCR controller 48 reads the peak cell rates from the traffic control table 32 and sets the corresponding FR time-out flags. The ACR controller 50 reads the allowed cell rates from the traffic control table 32 and sets the corresponding FV time-out flags, and adjusts the allowed cell rates according to congestion indications received from the BRM extractor 34. The FV time-out flags are in turn read by an FRM rate controller 54, which outputs an insertion command RC for each virtual path on the basis of the corresponding FV flag and resource-management cell rate parameter (Nrm).

A queue flag register 56 stores, for each virtual path, an additional pair of flag bits, QR and QV: the QR flag indicates the presence of at least one cell in the regular-class queue 22; the QV flag indicates the presence of at least one cell in the variable-class queue 24.

A first logic circuit 58 generates a first read signal RR from the FR and QR flags. This signal RR instructs the read controller 28 to take a cell from the regular-class queue 22 of the virtual path indicated by the virtual path counter 52. A second logic circuit 60 generates a second read signal RV from the FR, FV, and QV flags, the insertion command RC, and the first read signal RR. This signal RV instructs the read controller 28 to take a cell from the variable-class queue 24 of the virtual path indicated by the virtual path counter 52. A third logic circuit 62 generates a third read signal RF from the insertion command RC and the first read signal RR. This signal RF instructs the FRM inserter 26 coupled to the variable-class queue 24 indicated by the virtual path counter 52 to furnish an FRM cell to the read controller 28, and the read controller 28 to place this FRM cell in the outgoing cellstream.

The first logic circuit 58 in this embodiment performs a logical AND operation. The second and third logic circuits 60 and 62 perform combinations of NOT and AND logic.

Next the operation of the first embodiment will be described.

When a virtual-channel connection is established between two terminals, switching software in the virtual-channel and virtual-path switches assigns a virtual channel identifier (VCI) and virtual path identifier (VPI) to that connection at each node in the network. In the virtual-channel-switching node at which the traffic shaper 6 is located, the outgoing VPI/VCI values are stored in a table (not shown in the drawings) used by the header converter 16. In addition, each connection is assigned to one of two internal classes, these being a regular class and a variable class, and a corresponding internal class identifier (C) is stored in the table used by the header converter 16. In the following description, the internal class identifier (C) will take on values of one and zero, one denoting the regular class and zero the variable class.

The path and class assignments are made according to the quality of service (QoS) requested by the terminal. Generally speaking, real-time traffic such as audio and video traffic is placed in the regular class of a virtual path, and data traffic with less stringent timing requirements is placed in the variable class.

Referring again to FIG. 2, when the traffic shaper 6 receives a cell from the virtual-channel switch, the header converter 16 rewrites the header information in the cell to designate the virtual path, virtual channel, and internal class of the connection to which the cell belongs. The cell distributor 18 reads the virtual path identifier (VPI) and internal class identifier (C) values written by the header converter 16, and places the cell in the corresponding queue.

Referring again to FIG. 3, the PCR controller 48 uses the clock signal supplied by the clock generator 46 and the PCR parameters stored in the traffic control table 32 to maintain, for each virtual path, a PCR timer (not visible) that times out at the elapse of an interval corresponding to the PCR value. When this PCR timer times out, the PCR controller 48 sets the corresponding FR flag. The ACR controller 50 maintains, for each virtual path, an ACR timer (not visible) that times out at the elapse of an interval corresponding to the ACR value. When this ACR timer times out, the ACR controller 50 sets the corresponding FV flag. The output scheduler 30 furthermore receives from the pairs of queues 20 information indicating whether each queue is occupied, and sets the QV and QR bits in the queue flag register 56 accordingly.

The virtual path counter 52 counts cyclically from zero to n, thereby designating the virtual paths in turn. When each virtual path is designated, if the FR and QR bits of that virtual path are both set, the first logic circuit 58 activates the RR signal, causing the read controller 28 to take one cell from the regular-class queue 22 of that virtual path and place that cell in the outgoing cellstream. If the FR, FV, and QV bits are all set, the RC command is inactive, and the RR signal is inactive, the second logic circuit 60 activates the RV signal, causing the read controller 28 to take one cell from the variable-class queue 24 of the virtual path and place that cell in the outgoing cellstream.

Figure 4:
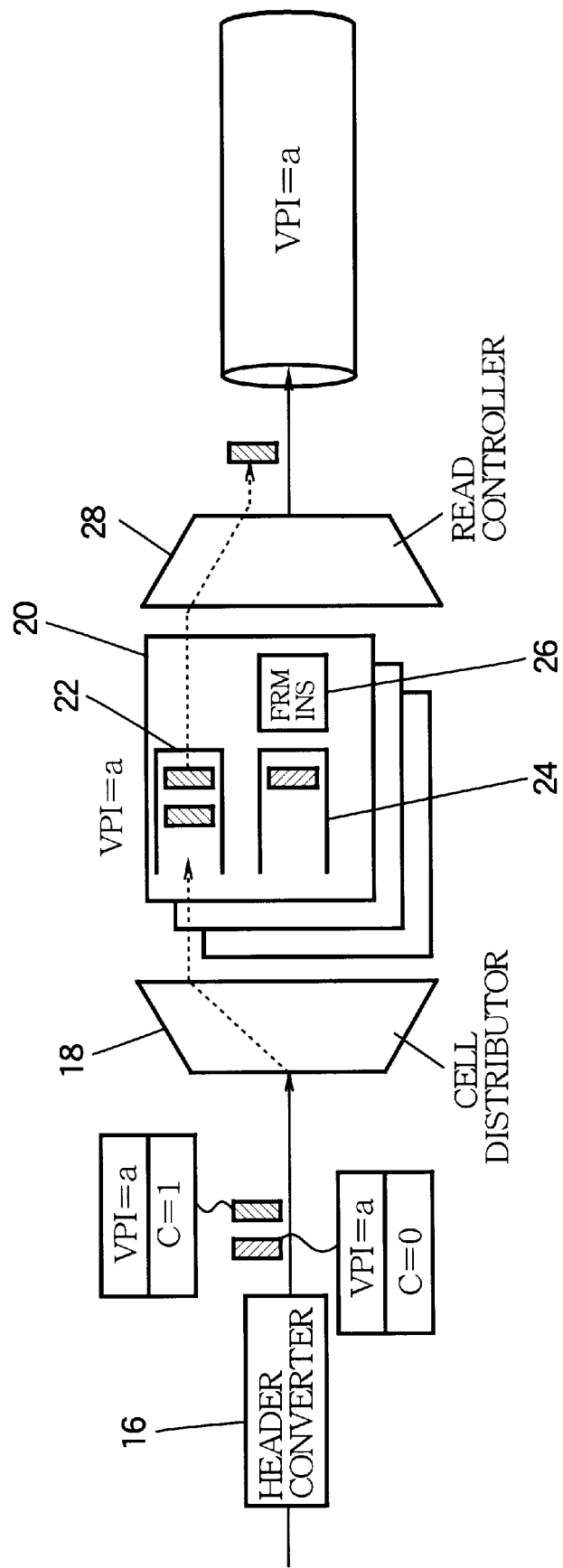
FIG. 4 illustrates the queuing and output of cells in the first embodiment.

FIG. 4 illustrates these operations, showing incoming cells with virtual path identifiers equal to a certain value "a" being placed in the regular-class queue 22 or variable-class queue 24 according to whether their internal class identifier (C) is equal to one or zero, and showing the read controller 28 taking a cell from the regular-class queue 22 of virtual path "a."

Figure 5:
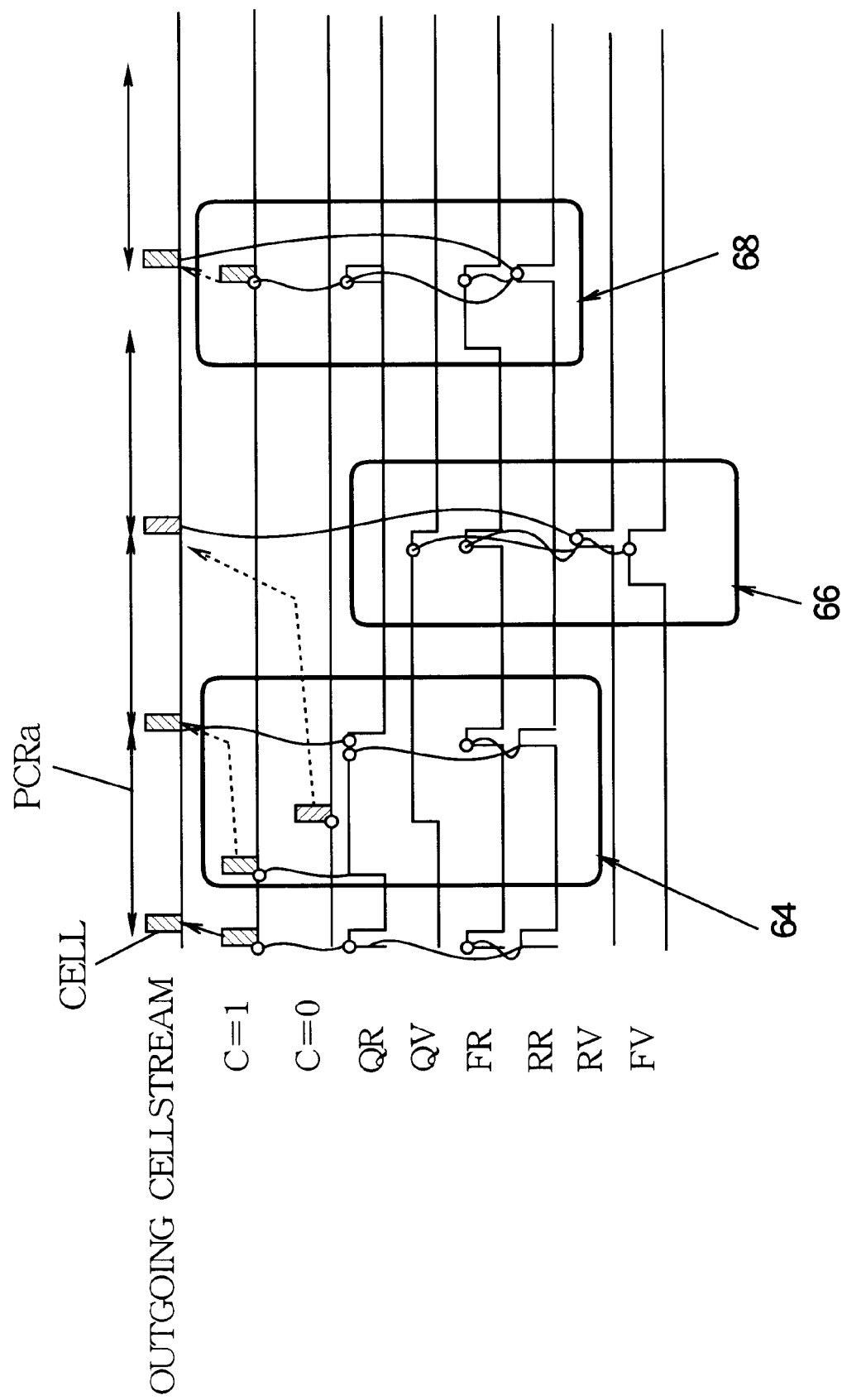
FIG. 5 is a timing diagram illustrating the operation of the first embodiment.

FIG. 5 illustrates these operations on virtual path "a" in more detail. The FRM cell insertion command (RC) is assumed to be inactive.

Output of a cell in the regular class (C=1) at the left edge of FIG. 5 leaves both queues 22 and 24 empty. In area 64 in the drawing, another regular-class cell arrives and is placed in the regular-class queue 22 (C=1), setting the QR flag. This cell is followed by a variable-class cell which is placed in the variable-class queue 24 (C=0), setting the QV flag. When the PCR timer times out, the FR flag is set. The first logic circuit 58 takes the logical AND of the QR and FR bits and activates the RR signal, causing the read controller 28 to take the cell from the regular-class queue 22 and place this cell in the outgoing cellstream. The regular-class queue 22 now becomes empty again, the QR flag is cleared, the PCR timer is restarted, and the FR flag is cleared. The RR signal accordingly returns to the inactive state.

In area 66, the ACR timer times out, setting the FV flag. When the PCR timer also times out a short while later, the second logic circuit 60 combines the active QV, FR, and FV flag bits with the inactive RR signal and RC command and activates the RV signal, causing the read controller 28 to take the cell from the variable-class queue 24 and place this cell in the outgoing cellstream. The variable-class queue 24 now becomes empty again, the QV flag is cleared, the ACR timer is restarted, the FV flag is cleared, and the RV signal becomes inactive again. The FR flag is also cleared, and the PCR timer is restarted.

In area 68, the PCR timer times out while both queues 22 and 24 are empty, so the FR flag remains set for a while. The next cell to arrive belongs to the regular class (C=1) and is placed in the regular-class queue 22, setting the QR bit. The first logic circuit accordingly activates the RR signal, and the cell is immediately placed in the outgoing cell stream.

Figure 6:
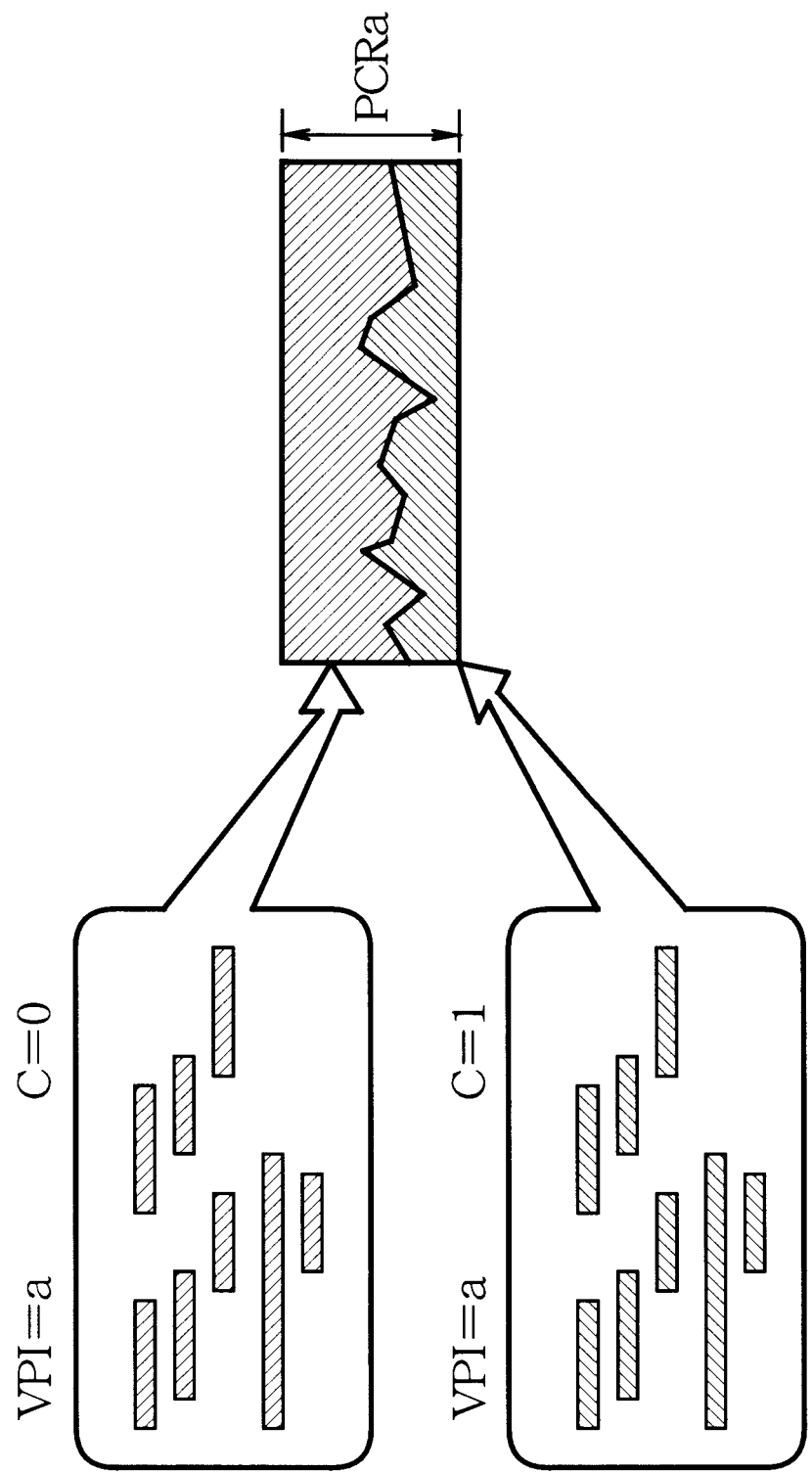
FIG. 6 illustrates the allocation of bandwidth in a virtual path in the first embodiment.

The bandwidth of virtual path "a," which is represented by the parameter PCRa, is thereby shared by cells in both the regular and variable classes, the regular-class traffic being given priority and the variable-class traffic being carried in the bandwidth left over after the regular-class traffic is served. The amount of bandwidth available for the variable-class traffic varies, depending on the volume of regular-class traffic, as illustrated in FIG. 6. The total volume of traffic in both classes combined never exceeds the peak cell rate (PCRa) allocated to virtual path "a."

The variable-class traffic comprises not only cells taken from the variable-class queue 24, but also FRM cells inserted by the FRM inserter 26. The FRM rate controller 54 counts the cells taken from each of the variable-class queues 24, by counting the number of times the corresponding ACR timer times out. After Nrma—1 cells have been taken from the variable-class queue 24 for virtual path "a," the next time the FR and FV flags are both set, the FRM rate controller 54 activates the cell insertion command RC. If the first logic circuit 58 does not activate the RR signal, because there is no cell in the regular-class queue 22, then the third logic circuit 62 activates the RF signal, the FRM inserter 26 generates an FRM cell with a congestion indication bit (CI) cleared to zero to indicate the non-congested state, and the read controller 28 inserts this FRM cell into the outgoing cellstream in place of a variable-class cell. The FRM cell is inserted regardless of whether the variable-class queue 24 contains a variable-class cell or is empty.

The combined flow of FRM cells and variable-class cells is thereby kept within the allowed cell rate (ACR), and the flow of FRM cells is kept within a fraction of the allowed cell rate, as designated by the resource-management cell rate parameter (Nrm), the fraction being 1/Nrm. Within this fractional rate (ACR/Nrm), the read controller 28 takes FRM cells in preference to variable-class cells.

The read controller 28 takes regular-class cells in preference to both FRM cells and regular-class cells. The total combined flow of regular-class cells, FRM cells, and variable-class cells in each virtual path is kept within the peak cell rate (PCR) assigned to the virtual path.

Upon receiving an FRM cell, the RM-cell terminator 36 in FIG. 2 returns a BRM cell stamped with the latest value of the EFCI bit pertaining to the virtual path on which the FRM cell arrived, taken from the EFCI register 42. As illustrated in FIG. 2, the EFCI bit is set to zero (indicating the not-congested state) when a cell enters the virtual-path-switching network 10, but may be set to one (warning of congestion) by one of the nodes in the virtual-path-switching network 10.

The output scheduler 30 checks these returning BRM cells, which are extracted by the BRM extractor 34. The virtual path indication (VPI) of the BRM cell also identifies the virtual path taken by the FRM cell to which the BRM cell is returned in reply. If the transmission of an FRM cell is followed within a certain time by the return of a corresponding BRM cell, and if the CI bit in the BRM cell is cleared to zero, indicating that there is no congestion or impending congestion on the virtual path taken by the FRM cell, then the output scheduler 30 increases the value of the ACR parameter by an amount equal to the resource-management cell rate (Nrm) multiplied by the additive increase rate (AIR). For virtual path "a," ACRa is increased by (Nrma× AIRa). If the result exceeds the peak cell rate PCRa, then ACRa is set equal to PCRa.

If the CI bit in the returning BRM cell is set to indicate congestion, or if the returning BRM cell is not received within the expected time (implying congestion), the output scheduler 30 decreases ACRa by an amount equal to the resource-management cell rate Nrma multiplied by the allowed cell rate ACRa and divided by the rate decrease factor RDF (Nrma×AIRa/RDFa).

Figure 7:
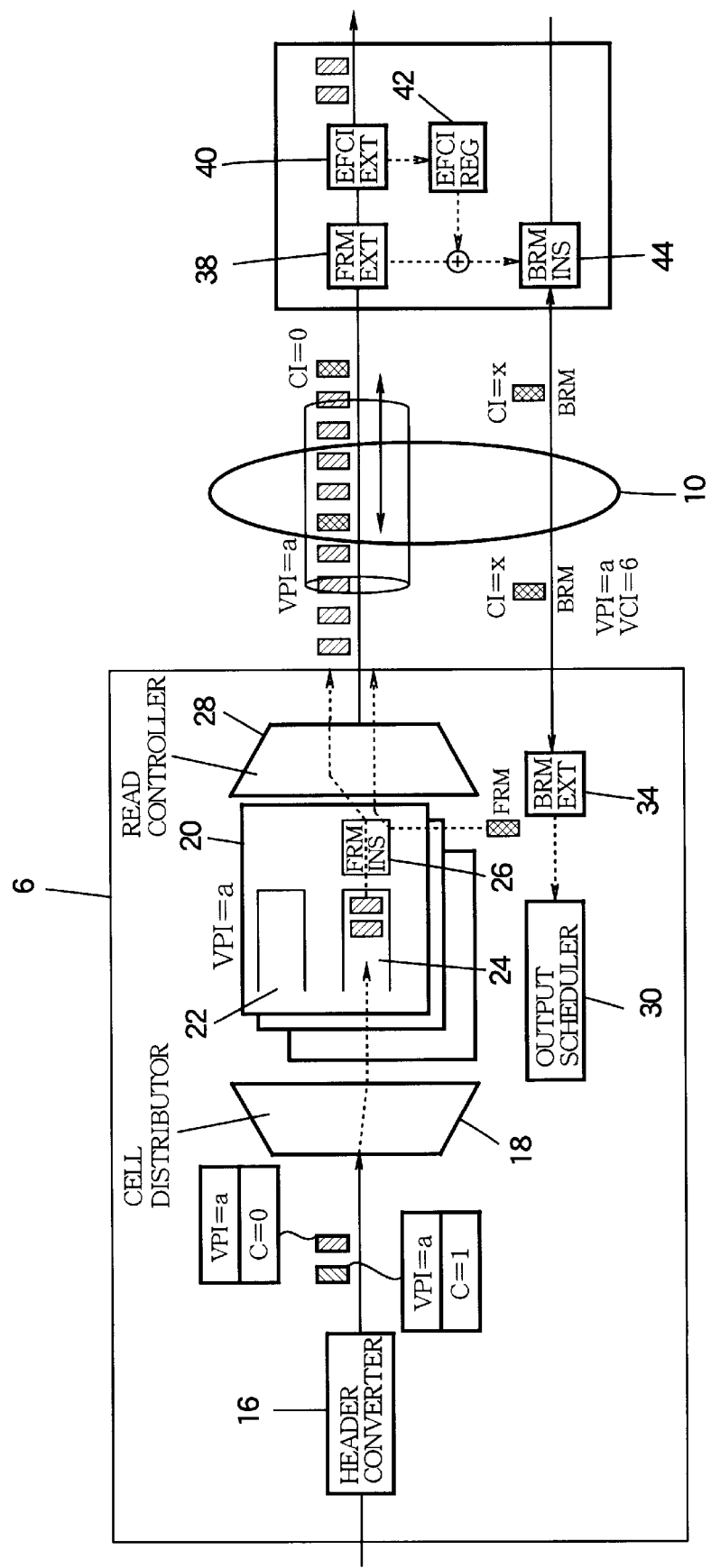
FIG. 7 illustrates the flow of resource-management cells in the first embodiment.

The resource-management cells are normally assigned to a particular virtual channel, e.g. the sixth virtual channel (VCI=6), to simplify the extraction of these cells from the cellstream. FIG. 7 illustrates the flow of variable-rate cells, FRM cells, and BRM cells under this arrangement, using light hatching to indicate the variable-rate cells, and darker hatching to indicate the FRM and BRM cells. The Nrma parameter is shown as being equal to five, so every fifth variable-rate cell is replaced by an FRM cell.

Figure 8:
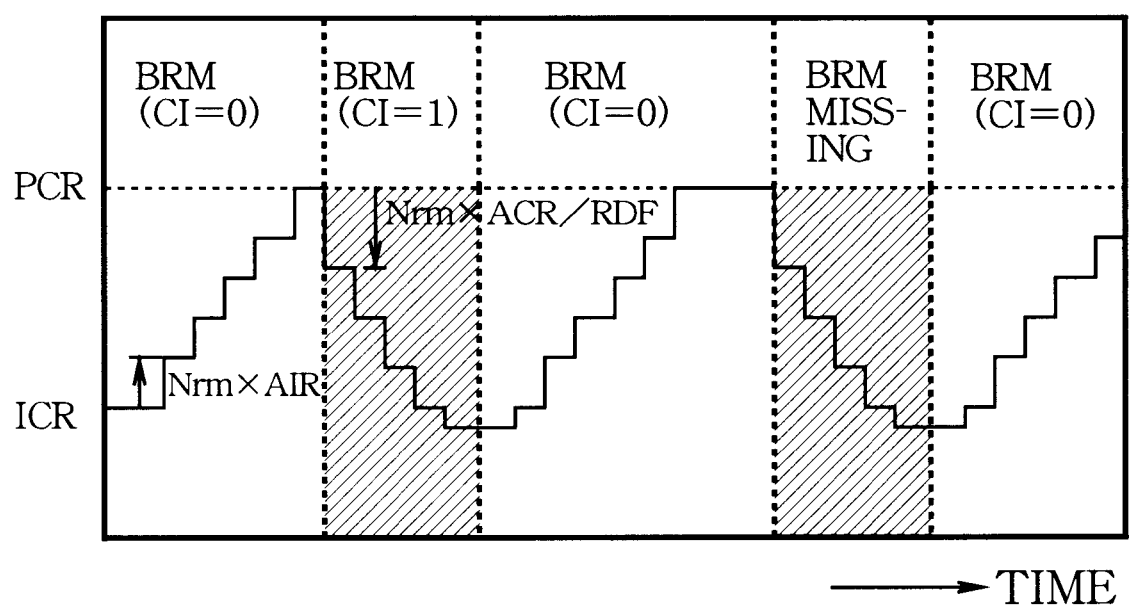
FIG. 8 is a graph illustrating adjustments to the allowed cell rate in a virtual path in the first embodiment.

FIG. 8 illustrates the variations in the allowed cell rate for a typical virtual path, showing time on the horizontal axis and the ACR value on the vertical axis. The ACR parameter is set at first to the initial cell rate (ICR). Following this initial setting, BRM cells with the CI bit cleared to zero are received, causing the ACR value to be increased in steps of Nrm×AIR, until the peak cell rate PCR is reached. A period of congestion or impending congestion then ensues, during which the CI bit is set to one in the returning BRM cells and the ACR value is decreased in steps of Nrm×ACR/RDF. After the congestion ends, ACR is increased in steps of Nrm×AIR until the PCR value is reached again. There next occurs a congestion period during which the expected BRM cells are not received, or are not received within the expected time, and ACR is decreased in steps of Nrm×ACR/RDF. This is followed by a period in which BRM cells with the CI bit cleared to zero are again received, and the ACR value is increased again.

One advantage of the first embodiment is that each virtual path offers two classes of service, permitting a large number of different service classes to be provided without the need for an equally large number of virtual paths. The network resources needed for switching virtual paths can therefore be reduced.

Another advantage is that by adjusting the allowed cell rate on each virtual path as described above, the traffic shaper 6 can adjust the outgoing cell flow according to congestion conditions in the network, without having to alter the peak cell rates and thereby disturb the regular-class traffic.

These advantages of the first embodiment are gained without any loss of compatibility with existing virtual-path switching systems. The forward and backward resource-management cells and EFCI and CI bits by which the variable cell rates are adjusted are standard features of ATM networks.

Next, a second embodiment will be described. The second embodiment differs from the first embodiment in having three queues per virtual path. The third queue is a priority queue. The header converter 16 now assigns cells to three internal classes: a variable-rate class (C=0), a regular class (C=1), and a priority class (C=2).

Figure 9:
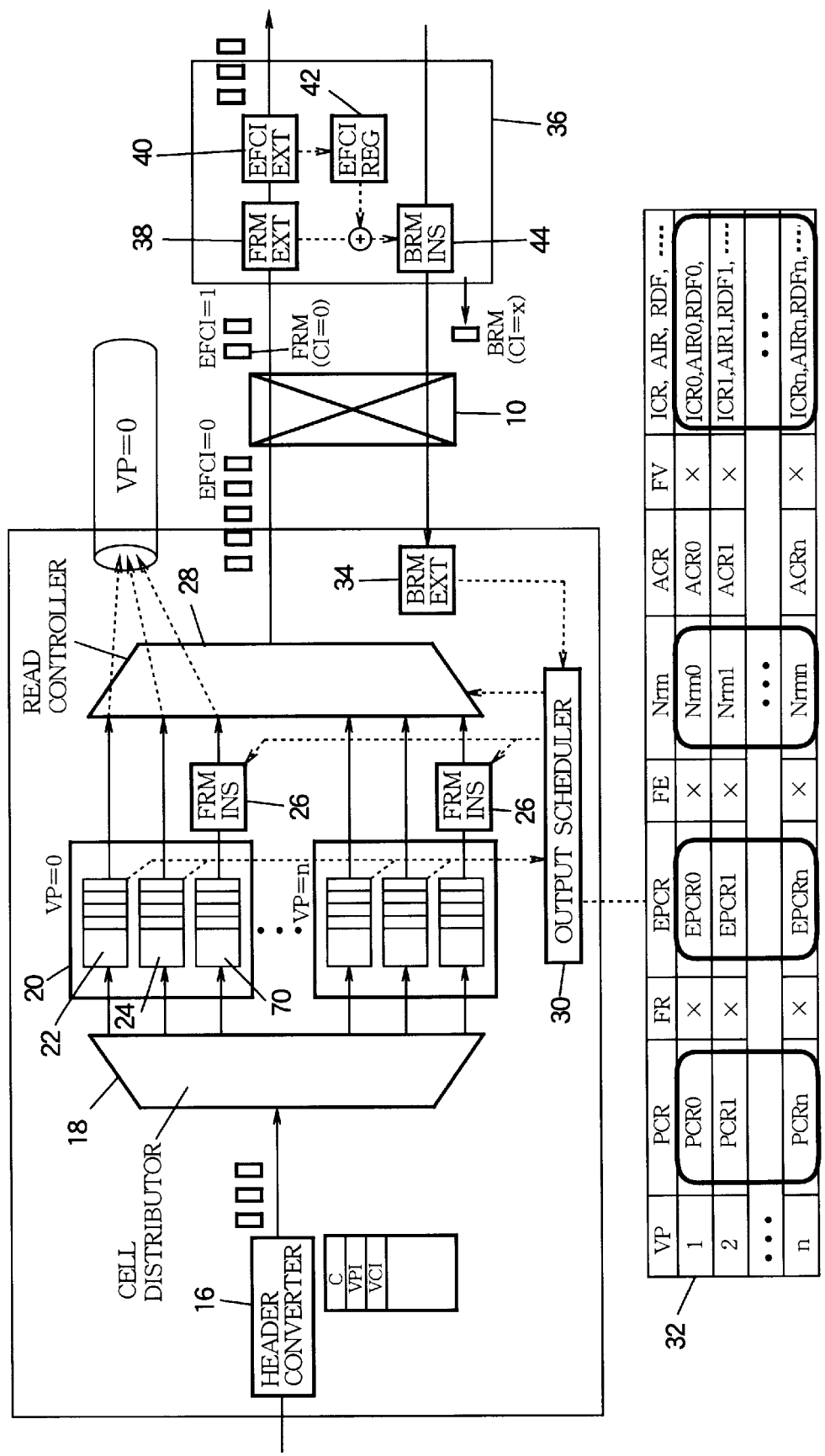
FIG. 9 is a block diagram illustrating a second embodiment of the invention.

Referring to FIG. 9, the priority queue 70 is controlled with reference to a priority cell rate parameter (EPCR) and a corresponding flag (FE) stored in the traffic control table 32. Each virtual path has a separate EPCR value and FE flag. The EPCR value is less than the peak cell rate PCR and, like the PCR value, can be set by software.

The other elements in FIG. 9 are similar to the corresponding elements with the same reference numerals in FIG. 2. Among the cells addressed to each virtual path, the cell distributor 18 places regular-class cells in the regular-class queue 22, variable-class cells in the variable-class queue 24, and priority-class cells in the priority-class queue 70.

Figure 10:
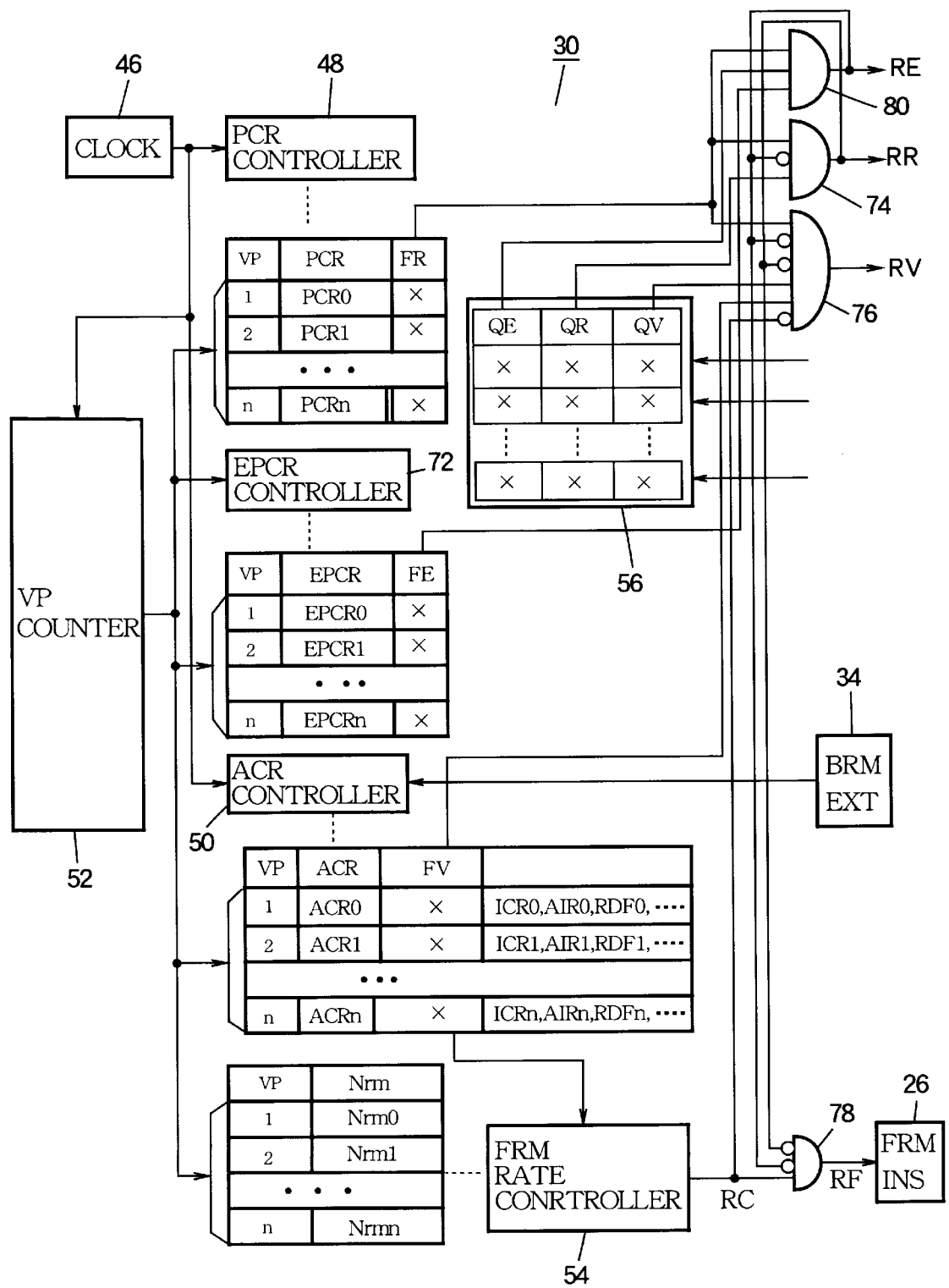
FIG. 10 illustrates the internal structure of the output scheduler in the second embodiment.

FIG. 10 shows the internal structure of the output scheduler 30 in the second embodiment, using the same reference numerals as in FIG. 3 for corresponding elements. The queue flag register 56 now stores three flag bits per virtual path, the QR and QV flags indicating the presence of cells in the regular-class queue 22 and variable-class queue 24, and the QE flag indicating the presence of cells in the priority queue 70. The EPCR controller 72 in FIG. 10 manages the FE time-out flags according to the EPCR parameters, in the same way that the PCR controller 48 manages the FR flags according to the PCR parameters.

The second embodiment has four logic circuits 74, 76, 78, and 80 that output respective read signals RR, RV, RF, and RE. When the FR, FE, and QE flags are set, the fourth logic circuit 80 activates the RE signal, causing the read controller 28 to take a cell from the priority queue 70. When the FR and QR bits are set and the RE signal is inactive, the first logic circuit 74 activates the RR signal, causing the read controller 28 to take a cell from the regular-class queue 22. When the RC command signal is active and the RE and RR signals are inactive, the fourth logic circuit 78 activates the RF signal, causing the FRM inserter 26 to insert an FRM cell. When the FR, FV, and QV flags are set and the RE, RR, and RC signals are inactive, the second logic circuit 76 activates the RV signal, causing the read controller 28 to take a cell from the variable-class queue 24.

The operation of the second embodiment is similar to the operation of the first embodiment, except that part of the bandwidth of each virtual path is given preferentially to priority-class cells. In each virtual path, that is, priority-class cells are taken in preference to regular-class cells, which are taken in preference to FRM cells, which are taken in preference to variable-class cells. The flow of priority-class cells is kept within the priority cell rate, and the combined flow of all types of cells in the virtual path is kept within the peak cell rate.

Figure 11:
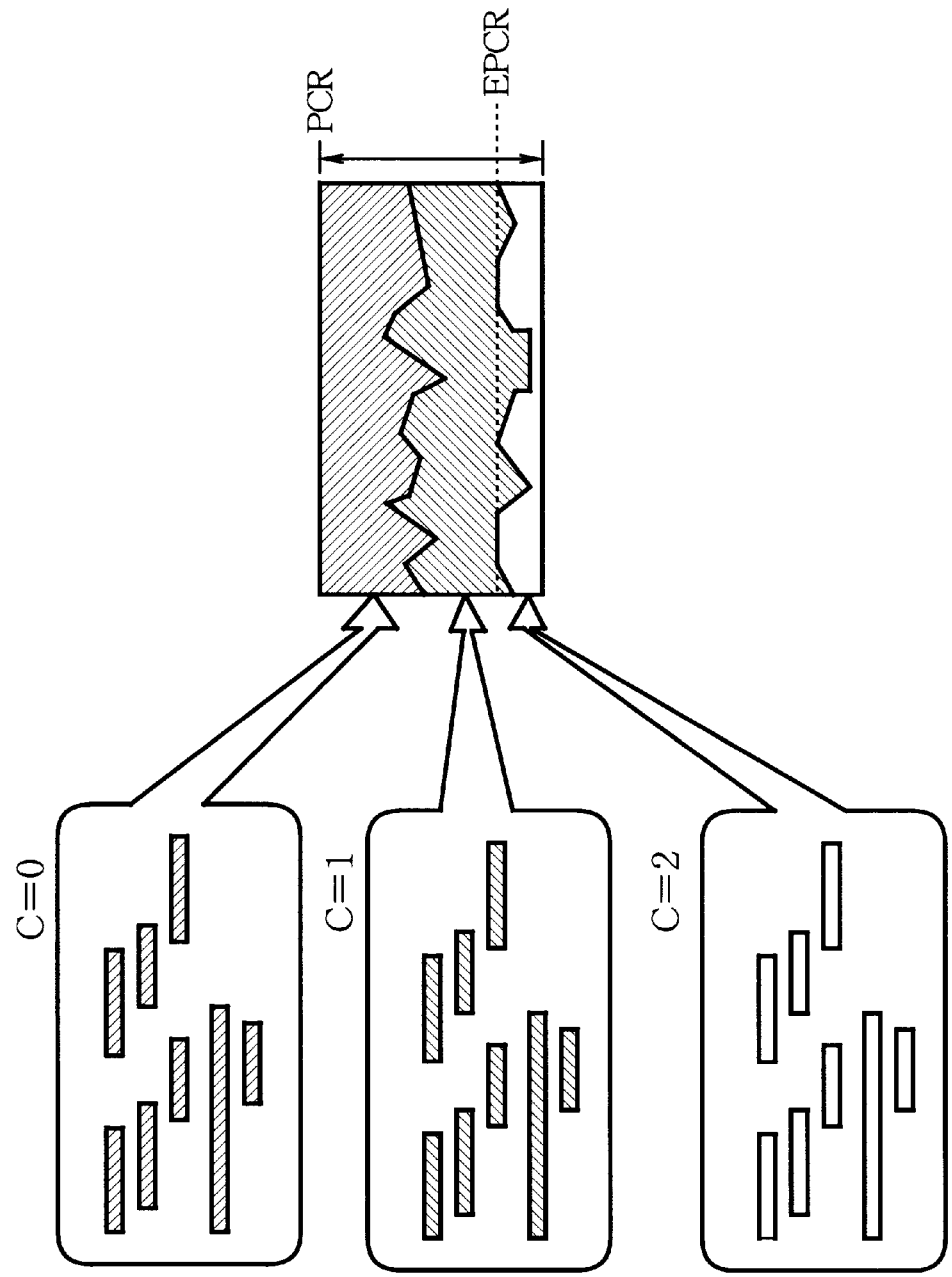
FIG. 11 illustrates the allocation of bandwidth in a virtual path in the second embodiment.

The operation of the second embodiment is illustrated in FIG. 11. A certain amount (EPCR) of the total bandwidth (PCR) of each virtual path is allocated to cells in the priority class (C=2). The rate at which priority cells are sent cannot exceed the limit set by the EPCR parameter. The part of the total bandwidth (PCR) not used by priority cell traffic is allocated to cells in the regular class (C=1). Any bandwidth remaining after that is allocated to cells in the variable class (C=0) and to FRM cells.

The allowed cell rate (ACR) is controlled in the same way as in the first embodiment. The ACR parameter limits the flow of variable-class cells and FRM cells as in the first embodiment.

The priority class can be reserved for urgent cell traffic that has a high intolerance for delay. If congestion forces the virtual-path-switching network 10 to reduce the level of service on a virtual path, the priority cell traffic will be least likely to suffer from the reduction. An extra-high quality of service is thereby provided for important cell traffic.

The present invention is not limited to the structures shown in the drawing. For example, the cell rate parameters and other parameter information and flags do not have to be stored in the form of a table as shown in FIGS. 2 and 9. No restriction is placed on the storage structure of this information, on the structure of the queues, or on the way in which an internal class identifier C is attached to each cell in the traffic shaper. No restriction is placed on the type of ATM network to which the invented traffic shaper is connected, provided the network has a virtual-path-switching capability. No restriction is placed on the network terminals, which may be personal computers, workstations, audio or video equipment, or various specialized types of terminals. No restriction is placed on the virtual-channel switch, which may operate in a computing device such as a workstation, or may operate as an independent item of switching equipment. No restriction is placed on the number of virtual paths served by the traffic shaper; this number may be any whole number equal to or greater than one.

Those skilled in the art will recognize that further variations are possible within the scope claimed below.

What is claimed is:

1. A method of shaping cell traffic entering an asynchronous-transfer-mode virtual-path-switching network on a virtual path, comprising the steps of:

providing a first queue designated for a first class of service, a second queue designated for a second class of service, a first parameter designating a peak cell rate of said virtual path, a second parameter designating an allowed cell rate of said virtual path, and a third parameter designating a resource-management cell rate of said virtual path;

receiving cells having header information designating said virtual path;

placing each received cell in one queue among said first queue and said second queue, according to said header information;

taking cells from said first queue at a rate not exceeding said peak cell-rate;

placing the cells taken from said first queue in a cellstream entering said network;

inserting forward resource-management cells in said cellstream, when said first-queue is empty, at a rate determined by said allowed cell rate and said resource-management cell rate, provided said forward resource-management cells and the cells taken from said first queue do not together exceed said peak cell rate;

taking cells from said second queue when said first queue is empty and no forward resource-management cell is inserted, provided said forward resource-management cells and the cells taken from said second queue do not together exceed said allowed cell rate, and provided said forward resource management cells, the cells taken from said first queue, and the cells taken from said second queue do not in total exceed said peak cell rate;

placing the cells taken from said second queue in cellstream;

receiving backward resource-management-cells in reply to said forward resource-management cells; and altering said second parameter, thereby altering said allowed cell rate, responsive to said backward resource-management cells, whereby the number of service classes served by said virtual path is increased while the number of virtual paths on the asynchronous-transfer-mode virtual-path-switching network remains constant.

2. The method of claim 1, wherein cell traffic enters said network on a plurality of virtual paths, each virtual path separately having a first queue, second queue, first parameter, second perameter, and third perameter as described in claim 1.

3. The method of claim 1, comprising the additional step of attaching internal class information to said cells when said cells are received and before said cells are queued, said internal class information designating one queue among said first queue and said second queue.

4. The method of claim 1, wherein said step of inserting forward resource-management cells comprises the further steps of:

counting the cells taken from said second queue; and inserting a forward resource-management cell instead of taking a cell from said second queue, after a certain number of cells have been taken from said second queue, said certain number being specified by said third parameter.

5. The method of claim 1, wherein said backward resource-management cells have congestion indication information, and said step of altering comprises the further steps of:

increasing said allowed cell rate when said backward resource-management cells do not indicate congestion;

decreasing said allowed cell rate when said backward resource-management cells indicate congestion; and decreasing said allowed cell rate when no backward resource-management cell is received in reply to one of said forward management cells.

6. The method of claim 1, comprising the further steps of:

storing a congestion indication for said virtual path in a register;

extracting an explicit forward congestion indication from cells received from said network;

updating said register according to said explicit forward congestion indication;

extracting said forward resource-management cells from said cellstream;

copying the congestion indication stored in said register to the forward resource-management cells thus extracted, thereby generating said backward resource-management cells; and returning said backward resource-management cells in reply to said forward resource-management cells; wherein said steps of storing, extracting, updating, extracting, copying, and returning are performed by a device that receives said cellstream from said network.

7. The method of claim 1, wherein said asynchronous-transfer-mode virtual-path-switching network complies with traffic control recommendations for broadband integrated-services digital networks.

8. A method of shaping cell traffic entering an asynchronous-transfer-mode virtual-path-switching network on a virtual path, comprising the steps of:

providing a first queue designated for a first class of service, a second queue designated for a second class of service, a third queue designated for a third class of service, a first parameter designating a peak cell rate of said virtual path, a second parameter designating an allowed cell rate of said virtual path, a third parameter designating a resource-management cell rate of said virtual path, and a fourth parameter designating a priority cell rate of said virtual path, said priority cell rate being less than said peak cell rate and whereby cells of a highest priority are prevented from monopolizing said virtual path;

receiving cells having header information designating said virtual path;

placing each received cell in one queue among said first queue, said second queue, and said third queue, according to said header information;

taking cells from said third queue at a rate not exceeding said priority cell rate;

placing the cells taken from said third queue in a cellstream entering said network;

taking cells from said first queue when no cell is taken from said third queue, provided the cells taken from said first queue and the cells taken from said third queue do not together exceed said peak cell rate;

placing the cells taken from said first queue in said cellstream;

inserting forward resource-management cells in said cellstream, when no cells are taken from said first queue and said third queue, at a rate determined by said allowed cell rate and said resource-management cell rate, provided the cells taken from said first queue, the cells taken from said third queue, and said forward resource-management cells do not together exceed said peak cell rate;

taking cells from said second queue when no cells are taken from said first queue and said third queue and no forward resource-management cell is inserted, provided said forward resource management cells and the cells taken from said second queue do not together exceed said allowed cell rate, and provided the cells taken from said first queue, the cells taken from said second queue, the cells taken from said third queue, and said forward resource management cells do not in total exceed said peak cell rate;

placing the cells taken from said second queue in said cellstream;

receiving backward resource-management cells in reply to said forward resource-management cells; and altering said second parameter, thereby altering said allowed cell rate, responsive to said backward resource-management cells, whereby the number of service classes served by said virtual path is increased while the number of virtual paths on the asynchronous-transfer-mode virtual-path-switching network remains constant.

9. The method of claim 8, wherein cell traffic enters said network on a plurality of virtual paths, each virtual path separately having a first queue, second queue, third queue, first parameter, second parameter, third parameter, and fourth parameter as described in claim 8.

10. The method of claim 1, comprising the additional step of attaching internal class information to said cells when said cells are received and before said cells are queued, said internal class information designating one queue among said first queue, said second queue and said third queue.

11. The method of claim 8, wherein said step of inserting forward resource-management cells comprises the further steps of:

counting the cells taken from said second queue; and inserting a forward resource-management cell instead of taking a cell from said second queue, after a certain number of cells have been taken from said second queue, said certain number being specified by said third parameter.

12. The method of claim 8, wherein said backward resource-management cells have congestion indication information, and said step of altering comprises the further steps of:

increasing said allowed cell rate when said backward resource-management cells do not indicate congestion;

decreasing said allowed cell rate when said backward resource-management cells indicate congestion; and decreasing said allowed cell rate when no backward resource-management cell is received in reply to one of said forward management cells.

13. The method of claim 8, comprising the further steps of:

storing a congestion indication for said virtual path in a register;

extracting an explicit forward congestion indication from cells received from said network;

updating said register according to said explicit forward congestion indication;

extracting said forward resource-management cells from said cellstream;

copying the congestion indication stored in said register to the forward resource-management cells thus extracted, thereby generating said backward resource-management cells; and returning said backward resource-management cells in reply to said forward resource-management cells; wherein said steps of storing, extracting, updating, extracting, copying, and returning are performed by a device that receives said cellstream from said network.

14. The method of claim 8, wherein said asynchronous-transfer-mode virtual-path-switching network complies with traffic control recommendations for broadband integrated-services digital networks.

15. A traffic shaper for shaping cell traffic entering an asynchronous-transfer-mode virtual-path-switching network, comprising:

a header converter for receiving cells having header information, and converting said header information to information specifying an outgoing virtual path, an outgoing virtual channel, and an internal class, said internal class being one class among a first class and a second class;

a plurality of first queues for holding cells awaiting transmission on respective virtual paths;

a corresponding plurality of second queues for holding cells awaiting transmission on said respective virtual paths;

a corresponding plurality of inserters coupled to respective second queues, generating forward resource management cells for transmission on said respective virtual paths;

a cell distributor coupled to said header converter, said first queues, and said second queues, for placing the cells received by said header converter in said first queues and said second queues according to said outgoing virtual path and said internal class, cells for which said first class is specified being placed in said first queues and cells for which said second class is specified being placed in said second queues;

a read controller coupled to said first queues, said second queues, and said inserters, for taking cells from said first queues and said second queues, taking said forward resource-management cells from said inserters, and transmitting the cells thus taken in an outgoing cellstream;

a traffic control table for storing parameters designating peak cell rates of respective virtual paths, parameters designating allowed cell rates of respective virtual paths, and parameters designating resource-management cell rates of respective virtual paths, said allowed cell rates not exceeding respective peak cell rates and said resource-management cell rates being fractions of respective allowed cell rates;

an extractor for receiving cell traffic from said network and extracting backward resource-management cells;

an output scheduler coupled to said read controller, said traffic control table, and said extractor, for monitoring said first queues and said second queues, controlling said read controller, and adjusting said allowed cell rate responsive to said backward resource-management cells;

whereby the number of service classes exceeds the number of virtual paths on the asynchronous-transfer-mode virtual-path-switching network and wherein said output scheduler commands said read controller to take said cells for different virtual paths in turn, following a preference rule within each virtual path, giving the cells in said first queues preference over said forward resource-management cells, giving said forward resource-management cells preference over the cells in said second queues, not permitting traffic of said forward resource-management cells to exceed respective resource-management cell rates, not permitting combined traffic of said forward resource-management cells and the cells taken from said second queues to exceed respective allowed cell rates, and not permitting total cell traffic on respective virtual paths to exceed respective peak cell rates.

16. The traffic shaper of claim 15, wherein said output scheduler keeps separate counts of the cells taken from each of said second queues, and commands said read controller to take forward resource-management cells instead of taking cells from respective second queues, when respective counts reach values determined by respective resource-management cell rates.

17. The traffic shaper of claim 15, wherein said backward resource-management cells have congestion indication information, and said output scheduler adjusts said allowed cell rates according to said congestion indication information.

18. The traffic shaper of claim 17, wherein said output scheduler increases said allowed cell rates when said backward resource-management cells do not indicate congestion, decreases said allowed cell rate when said backward resource-management cells indicate congestion, and decreases said allowed cell rates when backward resource-management cells are not received in reply to said forward management cells.

19. The traffic shaper of claim 15, wherein said asynchronous-transfer-mode virtual-path-switching network complies with traffic control recommendations for broadband integrated-services digital networks.

20. A traffic shaper for shaping cell traffic entering an asynchronous-transfer-mode virtual-path-switching network, comprising:

a header converter for receiving cells having header information, and converting said header information to information specifying an outgoing virtual path, an outgoing virtual channel, and an internal class, said internal class being one class among a first class and a second class;

a plurality of first queues for holding cells awaiting transmission on respective virtual paths;

a corresponding plurality of second queues for holding cells awaiting transmission on said respective virtual paths;

a corresponding plurality of third queues for holding cells awaiting transmission on said respective virtual paths;

a corresponding plurality of inserters coupled to respective second queues, generating forward resource management cells for transmission on said respective virtual paths;

a cell distributor coupled to said header converter, said first queues, said second queues, and said third queues, for placing said cells in said first queues, said second queues, and said third queues according to said outgoing virtual path and said internal class, cells for which said first class is specified being placed in said first queues, cells for which said second class is specified being placed in said second queues, and cells for which said third class is specified being placed in said third queues;

a read controller coupled to said first queues, said second queues, said third queues, and said inserters, for taking cells from said first queues, said second queues, and said third queues, taking said forward resource-management cells from said inserters, and transmitting the cells thus taken in an outgoing cellstream;

a traffic control table for storing parameters designating peak cell rates of respective virtual paths, parameters designating allowed cell rates of respective virtual paths, parameters designating priority cell rates of respective virtual paths, and parameters designating resource-management cell rates of respective virtual paths, said priority cell rates being less than respective peak cell rates, said allowed cell rates not exceeding respective peak cell rates, and said resource-management cell rates being fractions of respective allowed cell rates;

an extractor for receiving cells from said network and extracting backward resource-management cells;

an output scheduler coupled to said read controller, said traffic control table, and said extractor, for monitoring said first queues, said second queues, and said third queues, controlling sail read controller, and adjusting said allowed cell rate responsive to said backward resource-management cells; whereby the number of service classes exceeds the number of virtual paths on the asynchronous-transfer-mode virtual-path-switching network and wherein;

said output scheduler commands said read controller to take said cells for different virtual paths in turn, following a preference rule within each virtual path, giving the cells in said third queues preference over the cells in said first queues, giving the cells in said first queues preference over said forward resource-management cells, giving said forward resource-management cells preference over the cells in said second queues, not permitting traffic of the cells taken from said third queues to exceed respective priority cell rates, not permitting traffic of said forward resource-management cells to exceed respective resource-management cell rates, not permitting combined traffic of said forward resource-management cells and the cells taken from said second queues to exceed respective allowed cell rates, whereby traffic of cells taken from said first queues are prevented from monopolizing its said respective virtual path, and not permitting total cell traffic on respective virtual paths to exceed respective peak cell rates.

21. The traffic shaper of claim 20, wherein said output scheduler keeps separate counts of the cells taken from each of said second queues, and commands said read controller to take forward resource-management cells instead of taking cells from respective second queues, when respective counts reach values determined by said resource-management cell rates.

22. The traffic shaper of claim 20, wherein said backward resource-management cells have congestion indication information, and said output scheduler adjusts said allowed cell rates according to said congestion indication information.

23. The traffic shaper of claim 22, wherein said output scheduler increases said allowed cell rates when said backward resource-management cells do not indicate congestion, decreases said allowed cell rate when said backward resource-management cells indicate congestion, and decreases said allowed cell rates when backward resource-management cells are not received in reply to said forward management cells.

24. The traffic shaper of claim 20, wherein said asynchronous-transfer-mode virtual-path-switching network complies with traffic control recommendations for broadband integrated-services digital networks.

* * * * *